United States Patent
Doolittle et al.

(10) Patent No.: US 10,657,710 B2
(45) Date of Patent: May 19, 2020

(54) DISPLACEMENT DIRECTED TESSELLATION

(71) Applicant: SONY INTERACTIVE ENTERTAINMENT INC., Tokyo OT (JP)

(72) Inventors: John Doolittle, Belmont, CA (US); Jun Murakawa, Foster City, CA (US); Christopher Ho, Belmont, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 15/904,097

(22) Filed: Feb. 23, 2018

(65) Prior Publication Data

US 2018/0240272 A1 Aug. 23, 2018

Related U.S. Application Data

(60) Provisional application No. 62/462,889, filed on Feb. 23, 2017.

(51) Int. Cl.
*G06T 17/20* (2006.01)
*G06T 3/40* (2006.01)

(52) U.S. Cl.
CPC ............ *G06T 17/20* (2013.01); *G06T 3/40* (2013.01); *G06T 2210/36* (2013.01)

(58) Field of Classification Search
None
See application file for complete search history.

(56) References Cited

U.S. PATENT DOCUMENTS

2002/0190988 A1* 12/2002 Maillot ............... G06T 17/20
345/428
2016/0358376 A1 12/2016 Lacey et al.

FOREIGN PATENT DOCUMENTS

WO WO 2018/156982 8/2018

OTHER PUBLICATIONS

Doggett, Michael; "Displacement Mapping", ATI Research; Publication [online]. 2003 [retrieved Apr. 1, 2018]. Retrieved from the Internet: <URL:https://www.researchgate.net/profile/Michael_Doggett/publication/2556074_Displacement_Mapping/links/0c96052e787fb37b1d000000.pdf>; pp. 1-5, Jan. 13, 2003.
Forsyth, Tom; "GDC 2003 Displacement Mapping"; Muckyfoot Productions; www.muckyfoot.com, Jan. 12, 2003.
Guthe, Michael; "GPU-based trimming and tessellation of NURBS and T-Spline surfaces", ACM SIGGRAPH; Publication [online]. 2005 [retrieved Apr. 1, 2018]. Retrieved from the Internet: <URL: http://www.mathematik.uni-marburg.de/~guth/Publications/guthe-2005-gpu-based.pdf>; pp. 1-8.
PCT Application No. PCT/US2018/019561 International Search Report and Written Opinion dated Apr. 30, 2018.

* cited by examiner

*Primary Examiner* — James A Thompson
(74) *Attorney, Agent, or Firm* — Polsinelli LLP

(57) ABSTRACT

Systems, methods, and devices are disclosed for rendering computer graphics. In various embodiments, a displacement map is created for a plurality of surfaces and a tessellation process is initiated. It is determined that the tessellation density of a first set of surfaces and a second set of surfaces should be modified based on the displacement map. Based on the displacement map, a tessellation factor scale for each surface of the first set of surfaces is increased and a tessellation factor scale for each surface of the second set of surfaces is decreased, respectively.

17 Claims, 7 Drawing Sheets

DISPLACEMENT DIRECTED TESSELLATION

CROSS-REFERENCE TO RELATED APPLICATIONS

The present application claims the priority benefit of U.S. provisional application 62/462,889 filed on Feb. 23, 2017, the disclosure of which is incorporated herein by reference.

TECHNICAL FIELD

This application relates to computer graphics, and more particularly to a system and method for rendering computer graphics.

BACKGROUND

Highly detailed surface models are becoming commonplace in the area of computer graphics, in part due to three-dimensional scanning technologies. Typically, these models are represented as dense triangle meshes.

Subdivision surfaces have become popular recently in graphical modeling, animation, and computer aided design (CAD)/modeling (CAM) because of their stability in numerical computation, simplicity in coding, and most importantly their capability in modeling/representing complex shapes of arbitrary topology. However, current methods of subdivision suffer from exponential memory growth.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Figure 1:
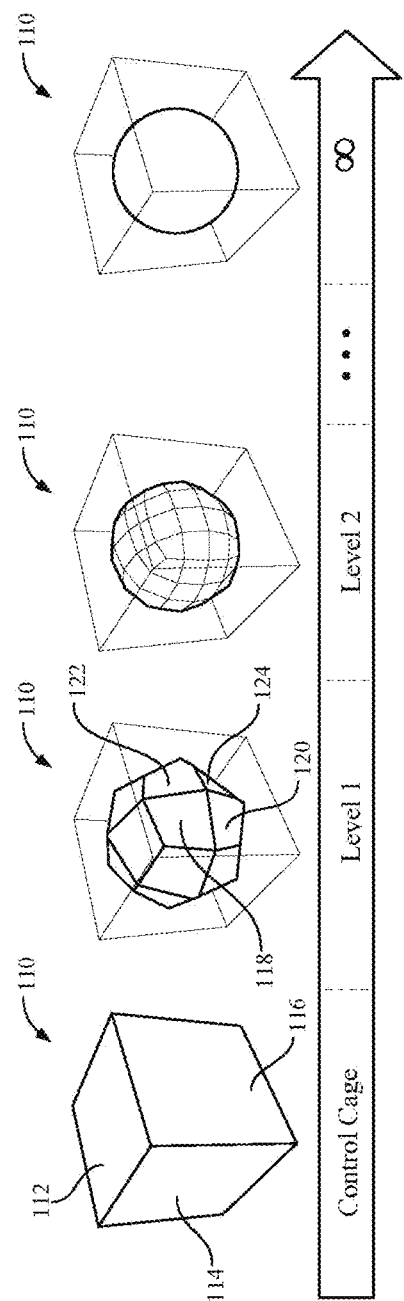
FIG. 1 illustrates an example graphical representation of subdivision surfaces.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

Systems, methods, and devices are disclosed for rending computer graphics. In various embodiments, a displacement map is created for a plurality of surfaces and a tessellation process is initiated. It is determined that the tessellation density of a first set of surfaces and a second set of surfaces should be modified based on the displacement map. Based on the displacement map, a tessellation factor scale for each surface of the first set of surfaces is increased and a tessellation factor scale for each surface of the second set of surfaces is decreased, respectively.

Example Embodiments:

The following presents a simplified summary of one or more embodiments in order to provide a basic understanding of the present technology. This summary is not an extensive overview of all the contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In an aspect, a method for rendering computer graphics using displacement directed tessellation samples a displacement map for a plurality of surfaces, such as sampling the displacement map in one or more pre-processes and then determining a set of scales per patch. A patch can be a subset of vertices and/or connected vertices on a mesh (e.g., can define a surface or subsurface on the mesh). The pre-process enables scaling up tessellation factors on patches that require high tessellation factors to accurately represent the displaced surface. The pre-process also allows patches that do not have much displacement to have their tessellation factors scaled down. The pre-process can moreover be combined with screen-space tessellation to have the tessellation factors scale up or down at variable rates.

The subject disclosure provides the devices and techniques for displacement directed tessellation. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

A tessellation of a flat surface is the tiling of a plane using one or more geometric shapes, called tiles, with no overlaps and no gaps. In mathematics, tessellations can be generalized to higher dimensions and a variety of geometries. In computer graphics, tessellation is used to manage datasets of polygons, sometimes called vertex sets, presenting objects in a scene and dividing them into suitable structures for rendering.

A subdivision surface, for example in the field of 3D computer graphics, is a method of representing a smooth surface via the specification of a coarser piecewise linear polygon mesh. The smooth surface can be calculated from the coarse mesh as the limit of recursive subdivision of each polygonal face into smaller faces that better approximate the smooth surface.

FIG. 1 illustrates an example graphical representation of subdivision surfaces. Subdivision surfaces provide a compact means of representing smooth surfaces. For example, a relatively simple control cage (mesh 110) can be represented as a box with faces 112, 114, 116, etc. A set of rules can split the faces and adjust vertices in order to smooth out the corners into a more complicated surface, such as a curved, smooth sphere. At level 1, for example, the faces of mesh 110 are subdivided into multiple surfaces to more closely approximate a smoother curve, such as face 116 being split into faces 118, 120, 122, and 124. Level 2 can subdivide the faces even further, until the faces are so subdivided that at an infinite level the shape of mesh 110 takes the form of a sphere (e.g., the subdivisions approaches the limit surface at infinite subdivisions). This methodology can be applied to approximate any number of shapes, and represents a mathematically simplified and compact way to model any desired shape.

Moreover, any deformation of mesh 110 propagates to the limit surface. Thus, as one vertex of the shape is moved, the shape can get pushed or pulled along with it, allowing expensive deformations to be applied to the shape because only the vertex needs to be run instead of the entire surface position.

Figure 2:
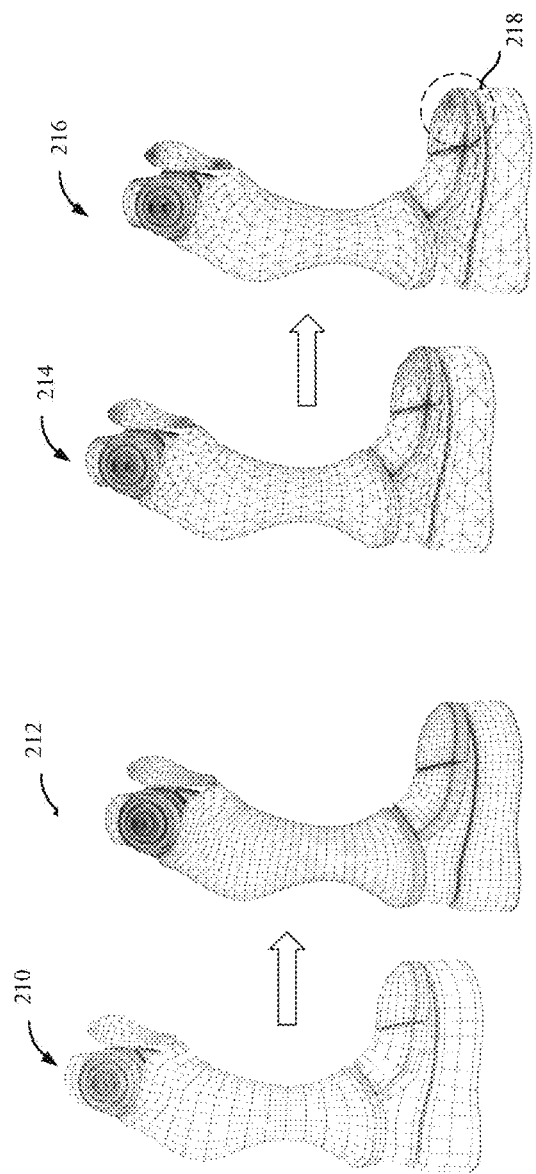
FIG. 2 illustrates an example graphical representation of uniform subdivision and feature adaptive subdivision.

Subdivision by itself, however, can result in exponential memory growth. FIG. 2 illustrates an example graphical representation of uniform subdivision and feature adaptive subdivision. In uniform subdivision, the overall simulated shape (e.g., base mesh 210) is subdivided into faces of equal size (e.g., mesh 212). While uniform subdivision enables the resolution of more details, the exponential increase in memory requirements can severely limit the performance capabilities of run-time simulation, especially as each face needs to be rendered in real-time on a frame by frame basis. Feature-adaptive subdivision techniques, however, reduces the above problem by introducing more subdivisions only when necessary and/or desired for much slower memory growth. Base mesh 214, for example, is subdivided using feature-adaptive subdivision to produce mesh 216. Most of the mesh looks similar between base mesh 214 and mesh 216, except in area 218 on mesh 216 where more subdivision was needed to bring out more detail. But while this technique increased detail in area 218, the computational requirements for mesh 216 did not increase significantly overall because computational resources were saved for the areas that did not need area 218's level of detail, thus allowing those computational resources to be saved and/or redirected elsewhere.

Feature-adaptive subdivision techniques, however, may produce features on the mesh that are not as smooth as desired. In order to increase mesh smoothness, in some embodiments tessellation and displacement mapping can be used in conjunction to improve run-time performance even more.

Displacement mapping is an alternative computer graphics technique in contrast to bump mapping, normal mapping, and parallax mapping, using a procedural texture or height map to cause an effect where the actual geometric position of points over the textured surface are displaced, often along the local surface normal, according to the value the texture function evaluates to at each point on the surface. It gives surfaces a great sense of depth and detail, permitting in particular self-occlusion, self-shadowing and silhouettes; on the other hand, it is the most costly of this class of techniques owing to the large amount of additional geometry.

Displacement mapping is a technique for adding geometric detail by sampling a texture and moving the positions of mesh vertices according to the sampled displacements. It is useful with tessellation because as tessellation rates increase the displacement map can be sampled more densely, thereby producing a surface that more accurately represents the surface intended by the displacement map.

Tessellation has a high run-time cost if it is applied with high tessellation factors to an entire mesh, so screen-space tessellation is commonly used to scale the tessellation rate according to the importance of each tessellated patch on screen (the importance being determined by various heuristics) for better performance. Tessellation is too slow (computationally taxing) to use densely on everything, so screen-space tessellation is frequently used to turn down tessellation on patches that are small on screen. This is much faster (less computationally taxing), but produces fairly uniform tessellation patterns which can be sub-optimal when using displacement mapping.

Figure 3:
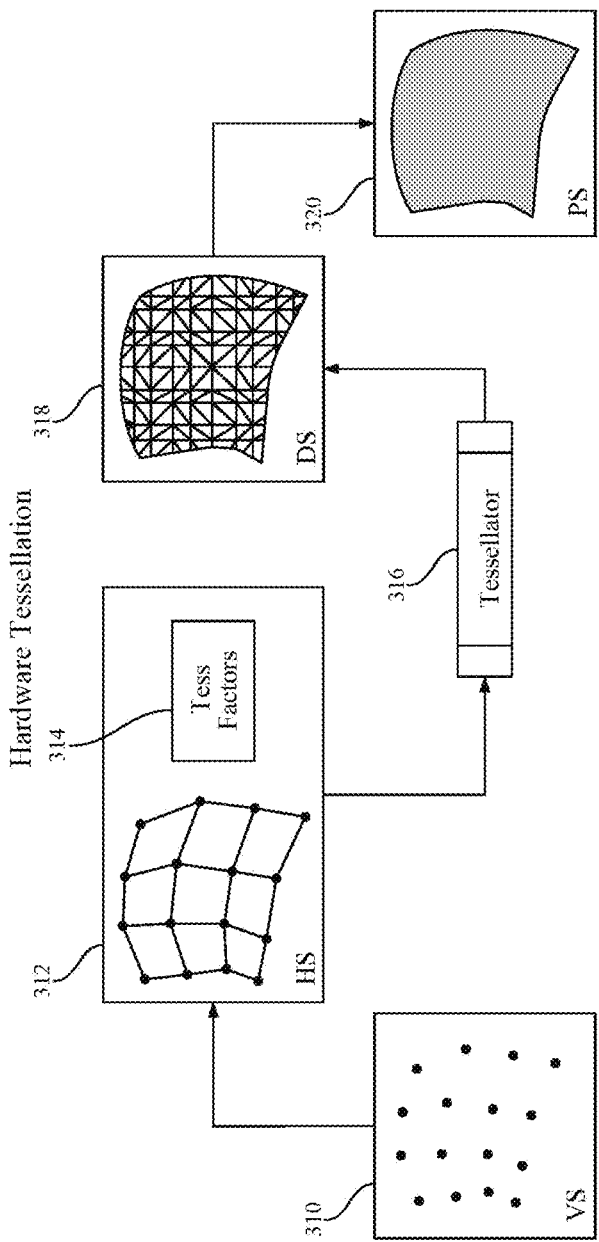
FIG. 3 illustrates an example graphical representation of hardware tessellation.

FIG. 3 illustrates an example graphical representation of hardware tessellation. In some embodiments, vertex shader service 310 transforms each input point individually, creating a set of vertices. Hull shader service 312 operates on a patch of the control points/vertices and calculates one or more tessellation factors 314, which control how heavily each patch is tessellated. Tessellator service 316 generates a tessellated patch as input to domain shader service 318, which interpolates values over the patch and/or can change the final positions of each vertex. Finally, the result is shaded as normal in pixel shader service 320 (e.g., is rendered).

Adaptive feature subdivision can implemented through the use of the above tessellation techniques, because as the mesh is subdivided and the tessellation rate is increased, the surface gets much smoother to closely match the limit surface. For example, the limit surface can be described as a set of b-spline patches which can be converted to Bezier patches. Those in turn can be rendered directly with hardware tessellation, which offers a great way to control performance vs. quality when combined with adaptive subdivision. An asset's mesh, for example, can be created once and then re-used with different tessellation levels as appropriate.

However, when screen-space tessellation is combined with displacement mapping, the combination can cause the tessellation to drop below what is needed to accurately represent the displaced surface. This can lead to visual artifacts that are particularly pronounced with fractional tessellation because the surface appears to swim up and down when it is under-sampled. The tessellation factors can shift across the displacement map in large steps when under-sampled, sampling potentially very different values each frame. While the artifact can be eliminated if the tessellation is always kept high, that approach is unacceptable for performance.

Displacement mapping, therefore, can add detail to a tessellated mesh, but to have optimal performance and displacement feature representation, the tessellation factors should not be uniform across the mesh. Ideally more displaced patches should be more tessellated and less displaced patches should have less tessellation. The required distribution can be determined as part of the pre-process where the displacement map is sampled and applied per tessellated patch in an increasingly dense grid pattern until the grid density is high enough to match a golden displaced surface. The golden displaced surface can be, for example, a surface with the correct displacement applied, as defined manually or by one or more threshold value(s). The required density of the grid can correspond closely to tessellation factors (e.g., tessellation factors 314), which can be stored per patch and used to scale the results of screen-space tessellation at run-time for better quality displacement with very low overhead.

Figure 4:
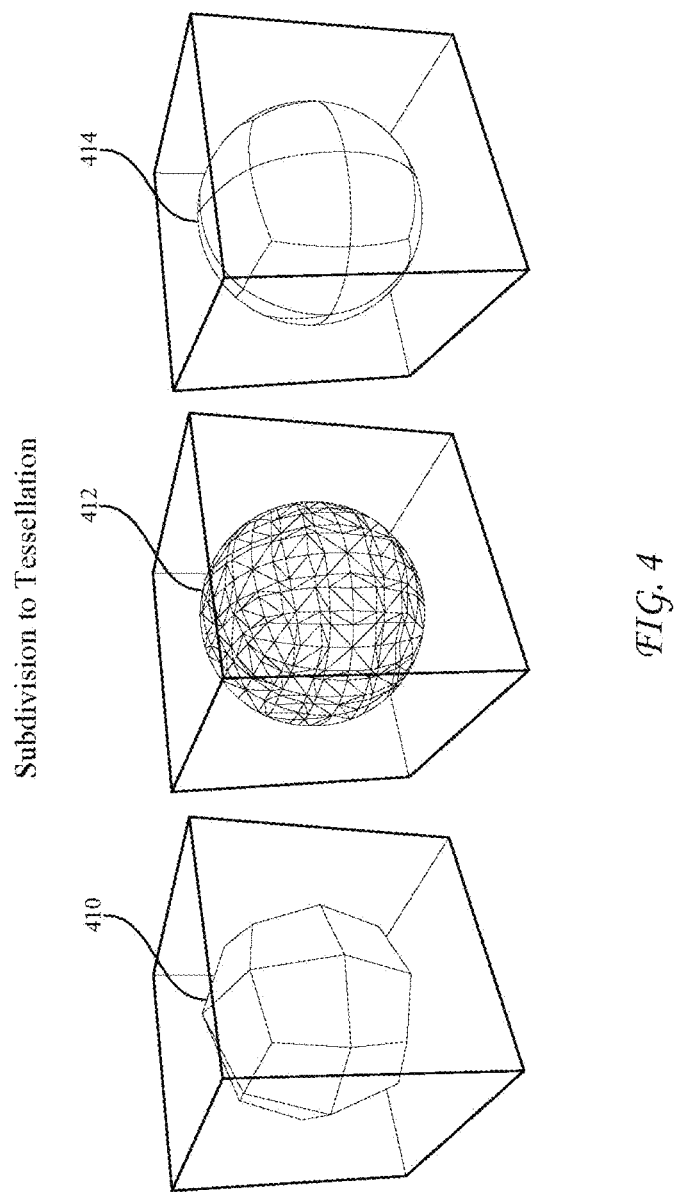
FIG. 4 illustrates an example graphical representation of subdivision to tessellation.

FIG. 4 illustrates an example graphical representation of subdivision to tessellation. First pass mesh 410 shows an example mesh that has been subdivided one time. Tessellated mesh 412 shows the mesh after being tessellated in conjunction with feature adaptive subdivision. Final mesh 414 shows the mesh after tessellation has been used. The shape becomes more spherical because more samples are taken on the curved limit surface as the tessellation rate increases. Thus, the total number of patches stays constant, but the mesh is smoothed into a spherical shape.

Figure 5:
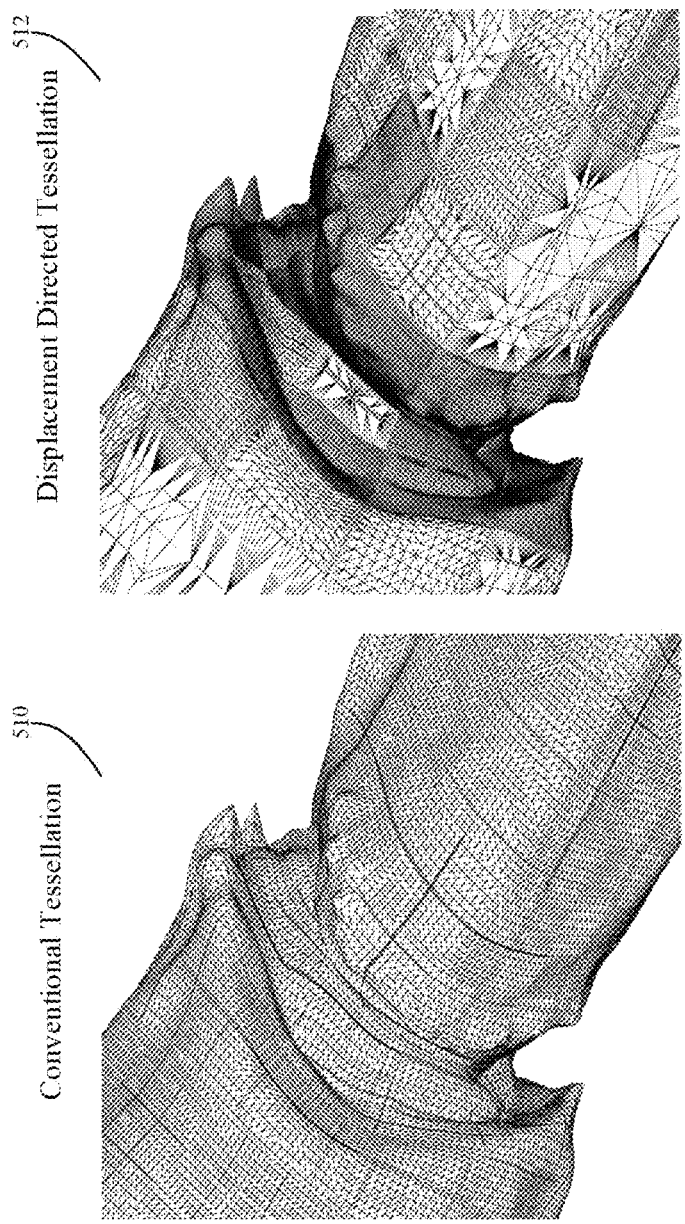
FIG. 5 illustrates an example graphical representation of conventional and displacement directed tessellation.

FIG. 5 illustrates an example graphical representation of conventional and displacement directed tessellation. Frame 510 shows a mesh using conventional tessellation, while Frame 512 shows a mesh using displacement directed tessellation. Frame 512 shows the same level of detail as frame 510 without destroying run-time frame rate (e.g., achieves the same final shape with a much less dense wireframe than frame 510).

Figure 6:
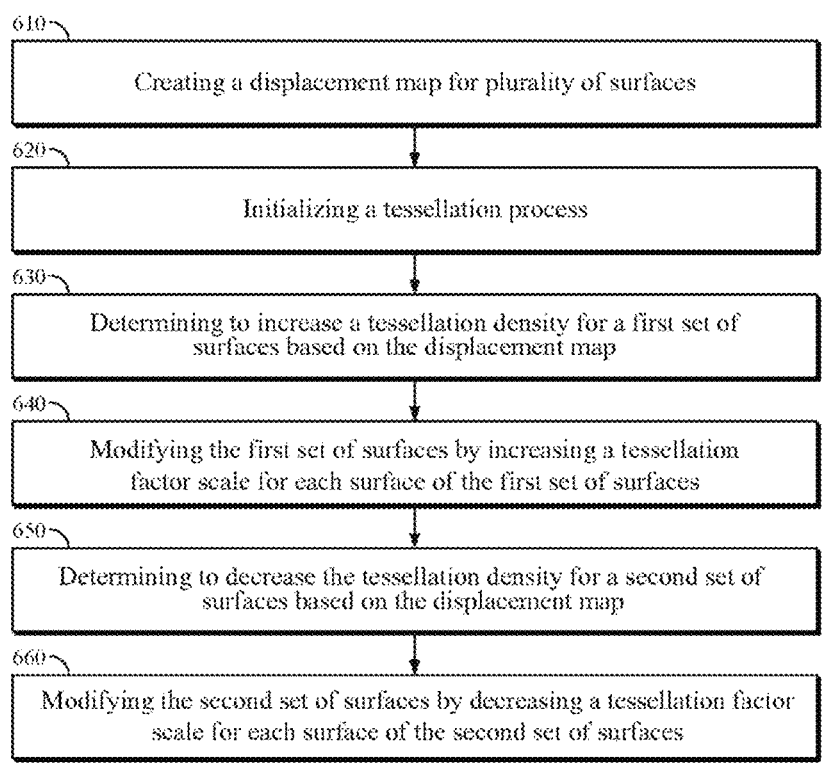
FIG. 6 illustrates an example methodology for rendering computer graphics.

FIG. 6 illustrates an example methodology for rendering computer graphics using the tessellation techniques in conjunction with displacement mapping. The method can, for example, begin by creating a displacement map for one or more surfaces (step 610). For example, the method can sample the displacement map in a pre-process prior to run-time and then determine a set of scales per patch. This can initiate a tessellation process (step 620), by enabling scaling up of the tessellation factor on patches that require a high tessellation factor to accurately represent the displaced surface. Importantly it also allows patches that do not have much displacement to have their tessellation factors scaled down. This can significantly improve performance, which enables the patches that do need high tessellation to actually be tessellated to a high degree while keeping tessellation low on the patches that do not. This can be combined with screen-space tessellation to have the tessellation factors scale up or down at variable rates, thereby greatly increasing image stability because patches that need high tessellation rates will not start under-sampling the displacement map until they are small enough on-screen to be visually unimportant.

In some embodiments, directing tessellation according to a displacement map by deciding per-patch tessellation factor scales can be done in a pre-process. In various embodiments, the scales can be referred to as "tessellation hints" as they do not fully control tessellation, but help scale up or down patches as needed on top of screen-space tessellation.

In some embodiments, the method can determine that a first set of patches, for example, need to be modified based on the sampled displacement map (step 630), which correspondingly causes the associated tessellation factors to be scaled up for each patch in the first set of patches (step 640). For example, the first patches may be comprised of numerous smooth surfaces and/or fine detail. Additionally and/or alternatively, the method can determine that a second set of patches, for example, need to be modified based on the sampled displacement map (step 650), which the causes the associated tessellation factors to be scaled down for each patch in the second set of patches (step 660).

Tessellation factors can be scaled up or down based on the displacement map because it is more efficient to have more dense tessellation in areas of greater displacement and less dense tessellation where there is not much displacement. Moreover, when scaling tessellation factors as a pre-process, a host tool can generate the patches that can be used for rendering with hardware tessellation. As part of this patch generation, for example, UV's (coordinates in the texture coordinate space) that would be used to texture the mesh at run-time should be assigned to each patch. For each patch, the UV's can be used to densely sample the displacement map, such as the run-time displacement map available in the pre-process, across the patch. Then the patch can be evaluated at each sample location and a grid of displaced positions can be created across the patch. In some embodiments, displacement sampling can correspond to a "golden" surface—i.e. the goal of what the displacement should produce at run-time, which can be set to some threshold (e.g., difference from an idealized surface or shape) or set manually.

For example, in order to reach the "golden" surface, the displacement map across the first set of patches can be initially sampled at a first density, and then subsequently sampled across the first set of surfaces at a second density, the second density being lower than the first density. If it is determined that the first set of surfaces is matched below a first threshold accuracy (e.g., does not meet a certain predefined accuracy), the displacement map can be sampled across the first set of surfaces at a third density higher than the second density, but lower than the first density based on the determination. The displacement map can be sampled across the first set of surfaces at successively higher densities until the threshold accuracy, or the "golden" surface, is met.

In some embodiments, the patch will start sampling again at much lower densities and compare whether any lower density samples produce a result that is close enough to the "golden" surface to be considered sufficiently accurate. This is measured by triangulating the sample grids and measuring the total surface area of the lower density grid vs the golden grid. For example, a 99 percent surface area match can be accepted as a good match (note: any desired degree of accuracy could be used). If the match is not accurate enough then the process is repeated with a slightly higher density grid and compared to the golden grid again until it is a good match.

Each of the successively larger grid sizes can correspond closely to how dense patches get when tessellated. If the grid is accurate at low density then it means that the tessellation factors for the patch do not need to be high to accurately represent the displacement. A scale then, for example, can be calculated for inner tessellation factors and other scales for outer tessellation factors. For example, the inner scale can be between 0.1 and 1 and lowers tessellation rates on over-tessellated patches. The outer tessellation factor scales can scale tessellation rates higher and are needed to ensure that adjacent patches have the same scale. For example, there could be cracks between patch boundaries if two adjacent patches have different scales.

At run-time standard screen-space tessellation is scaled by the per-patch tessellation factors. For example, screen-space tessellation can be configured to be scaled at run-time by a first tessellation factor for a first set of patches (e.g., for more detailed areas) and a second tessellation factor for a second set of patches (e.g., for less detailed areas) at run-time. This dramatically reduces tessellation in areas that do not need it (according to the displacement map) and provides much more detail in areas that have a lot of displacement. This results in a good performance improvement and a better quality surface because the tessellation can be heavier only in places that need it.

In some embodiments, because this is a pre-process, if an area is under or over tessellated by the automatic process then a texture can also be used to override the tessellation hints created automatically from the displacement map. For example, the first tessellation factor for the first set of patches can be determined to require an amount of computational resources above some specified performance threshold. Based on that determination, a texture can be inserted instead of tessellating the first set of surfaces in the pre-process.

For example, an artist could paint a value on a texture with the same UV layout as the displacement map, and that could influence the hint (e.g. a value of 0.5 could tessellate the patch 50% of maximum tessellation factors). If the texture has the value of 0 then the automatic calculation would be used instead. This allows an artist to touch up the amount of tessellation if it is too slow or does not match the shape sufficiently.

In some embodiments, computational resources can be saved by reducing accuracy for visually unimportant areas, such as objects in the background, objects not on screen, objects not meant to draw a user's focus, and/or areas considered small enough or occupying a portion of the screen where detail and accuracy is not needed or desired. For example, if it is determined that a set of patches will extend a screen-space size lower than a specific run-time area, the displacement map can be sampled across the first set of surfaces at successively lower densities until, for example, a second threshold accuracy is met, where the second threshold accuracy is less accurate than the first threshold accuracy.

Figure 7:
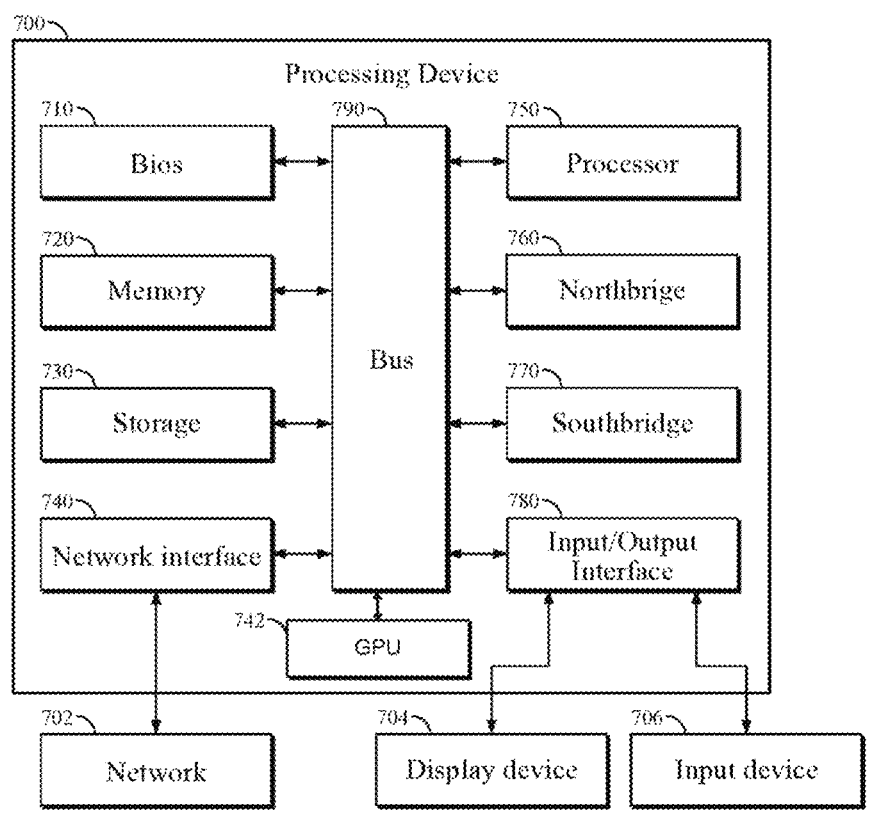
FIG. 7 illustrates a block diagram of an example processing device.

FIG. 7 illustrates a block diagram of an example processing device 700. The processing device 700 can include a Basic Input/Output System (BIOS) 710, a memory 720, a storage 730, a network interface 740, a processor 750, a northbridge 760, a southbridge 770, an input/output (IO) interface 780, and a GPU 742 that performs the tessellation at run-time.

The processing device 700 can be any apparatus for processing data, such as for example, a server computer (e.g., one of many rack servers in a data center), a personal computer, a laptop computer, a smartphone, a tablet, an entertainment console, a wearable device, or a set top box. The processor (e.g., central processing unit (CPU)) 750 can be a chip on a motherboard that can retrieve and execute programming instructions stored in the memory 720. The processor 750 can be a single CPU with a single processing core, a single CPU with multiple processing cores, or multiple CPUs. One or more buses 790 can transmit instructions and application data between various computer components such as the processor 750, memory 720, storage 730, and networking interface 740.

The memory 720 can include any physical device used to temporarily or permanently store data or programs, such as various forms of random-access memory (RAM). The storage 730 can include any physical device for non-volatile data storage such as a HDD or a flash drive. The storage 730 can often have greater capacity than the memory 720 and can be more economical per unit of storage, but can also have slower data transfer rates.

The BIOS 710 can include a Basic Input/Output System or its successors or equivalents, such as an Extensible Firmware Interface (EFI) or Unified Extensible Firmware Interface (UEFI). The BIOS 710 can include a BIOS chip located on a motherboard of the processing device 700 storing a BIOS software program. The BIOS 710 can store firmware executed when the computer system is first powered on along with a set of configurations specified for the BIOS 710. The BIOS firmware and BIOS configurations can be stored in a non-volatile memory (e.g., NVRAM) 712 or a ROM such as flash memory. Flash memory is a non-volatile computer storage medium that can be electronically erased and reprogrammed.

The BIOS 710 can be loaded and executed as a sequence program each time the processing device 700 is started. The BIOS 710 can recognize, initialize, and test hardware present in a given computing system based on the set of configurations. The BIOS 710 can perform self-test, such as a Power-on-Self-Test (POST), on the processing device 700. This self-test can test functionality of various hardware components such as hard disk drives, optical reading devices, cooling devices, memory modules, expansion cards and the like. The BIOS can address and allocate an area in the memory 720 in to store an operating system. The BIOS 710 can then give control of the computer system to the OS.

The BIOS 710 of the processing device 700 can include a BIOS configuration that defines how the BIOS 710 controls various hardware components in the processing device 700. The BIOS configuration can determine the order in which the various hardware components in the processing device 700 are started. The BIOS 710 can provide an interface (e.g., BIOS setup utility) that allows a variety of different parameters to be set, which can be different from parameters in a BIOS default configuration. For example, a user (e.g., an administrator) can use the BIOS 710 to specify clock and bus speeds, specify what peripherals are attached to the computer system, specify monitoring of health (e.g., fan speeds and CPU temperature limits), and specify a variety of other parameters that affect overall performance and power usage of the computer system.

The network interface 740 connects the processing device 700 to a network 702. The network interface 350 is configured to transmit data to and from the network 702. The network 702 can include a wide area network (WAN) such as the Internet, or a local area network (LAN). The network 702 can include an intranet, a storage area network (SAN), a personal area network (PAN), a metropolitan area network (MAN), a wireless local area network (WLAN), a virtual private network (VPN), a cellular or other mobile communication network, a wireless local area networking (WiFi) network, a BLUETOOTH® wireless technology connection, a near field communication (NFC) connection, any combination thereof, and any other appropriate architecture or system that facilitates the communication of signals, data, and/or messages.

The I/O interface 780 allows the processing device 700 to connect with I/O devices such as a keyboard, a mouse, a remote control, a controller, a microphone, a television, a head mounted display (HMD), and/or a monitor, etc.

The northbridge 760 can be a chip on the motherboard that can be directly connected to the processor 750 or can be integrated into the processor 750. In some instances, the northbridge 760 and the southbridge 770 can be combined into a single die. The northbridge 760 and the southbridge 770, manage communications between the processor 750 and other parts of the motherboard. The northbridge 760 can manage tasks that require higher performance than the southbridge 770. The northbridge 760 can manage communications between the processor 750, the memory 720, and video controllers (not shown). In some instances, the northbridge 760 can include a video controller.

The southbridge 770 can be a chip on the motherboard connected to the northbridge 760, but unlike the northbridge 760, is not directly connected to the processor 750. The southbridge 770 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing device 700. The southbridge 770 can be connected to or can include within the southbridge 770 the I/O interface 770, Direct Memory Access (DMAs) controllers, Programmable Interrupt Controllers (PICs), and a real-time clock.

One or more input devices 706 can connect to the processing device 700. The input device 706 can also be integrated into the processing device 700. The input device 706 can be at least one of a game controller, a joystick, a mouse, a keyboard, a touchscreen, a trackpad, or other similar control device. The input device 706 allows a user to provide input data to the processing device 700.

One or more display devices 704 can connect to the processing device 700. The display device 704 can also be integrated into the processing device 700. The display device 704 can be at least one of a monitor, a light-emitting display (LED) screen, a liquid crystal display (LCD) screen, a head mounted display (HMD), a virtual reality (VR) display, a augmented reality (AR) display, or other such output device. The display device 704 allows the processing device 700 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method for rendering computer graphics, the method comprising:
   creating a displacement map for a plurality of surfaces;
   sampling the plurality of surfaces in the created displacement map;
   initializing a tessellation process;
   determining a tessellation density for a first set of the surfaces based on the displacement map;
   assigning a texture to the tessellation factor scale based on identifying that a tessellation factor scale corresponding to the tessellation density is associated with an amount of computational resources above a performance threshold;
   modifying the first set of surfaces by applying the assigned texture to each surface of the first set of surfaces;
   determining to decrease the tessellation density for a second set of the surfaces based on the displacement map; and
   modifying the second set of surfaces by decreasing a tessellation factor scale for each surface of the second set of surfaces.

2. The method of claim 1, wherein the displacement map is created in a pre-process prior to run-time.

3. The method of claim 1, wherein sampling the plurality of surfaces in the created displacement map comprises:
   sampling the displacement map across the first set of surfaces at a first density;
   subsequently sampling the displacement map across the first set of surfaces at a second density, the second density being lower than the first density;
   determining that the first set of surfaces is matched below a first threshold accuracy; and
   sampling the displacement map across the first set of surfaces at a third density that is higher than the second density, but lower than the first density based on the determination.

4. The method of claim 3, further comprising sampling the displacement map across the first set of surfaces at successively higher densities until a threshold accuracy is met.

5. The method of claim 3, further comprising:
determining that the first set of surfaces will extend a screen-space size lower than a run-time area; and
sampling the displacement map across the first set of surfaces at successively lower densities until a second threshold accuracy is met, the second threshold accuracy being less accurate than the first threshold accuracy based on the determination.

6. The method of claim 1, wherein screen-space tessellation is configured to be scaled at run-time by the tessellation factor scale for each surface of the first set of surfaces and the tessellation factor scale for each surface of the second set of surfaces.

7. A system for rendering computer graphics, the system comprising:
a displacement map service executable to create a displacement map for a plurality of surfaces; and
a tessellation service executable to:
sample the plurality of surfaces in the created displacement map;
initialize a tessellation process;
determine a tessellation density for a first set of surfaces to be scaled up based on the displacement map;
assign a texture to the tessellation factor scale based on identifying that a tessellation factor scale corresponding to the tessellation density is associated with an amount of computational resources above a performance threshold;
modify the first set of surfaces by applying the assigned texture to each of the first set of surfaces;
determine to decrease the tessellation density for a second set of surfaces based on the displacement map; and
modify the second set of surfaces by decreasing a tessellation factor scale for each surface of the second set of surfaces.

8. The system of claim 7, wherein the displacement map is created in a pre-process prior to run-time.

9. The system of claim 7, wherein the tessellation service samples the plurality of surfaces in the created displacement map by:
sampling the displacement map across the first set of surfaces at a first density;
subsequently sampling the displacement map across the first set of surfaces at a second density, the second density being lower than the first density;
determining that the first set of surfaces is matched below a first threshold accuracy; and
sampling the displacement map across the first set of surfaces at a third density that is higher than the second density, but lower than the first density based on the determination.

10. The system of claim 9, wherein the tessellation service is further executable to sample the displacement map across the first set of surfaces at successively higher densities until a threshold accuracy is met.

11. The system of claim 9, wherein the tessellation service is further executable to:
determine that the first set of surfaces will extend a screen-space size lower than a run-time area; and
sample the displacement map across the first set of surfaces at successively lower densities until a second threshold accuracy is met, the second threshold accuracy being less accurate than the first threshold accuracy based on the determination.

12. The system of claim 7, wherein screen-space tessellation is configured to be scaled at run-time by the tessellation factor scale for each surface of the first set of surfaces and the tessellation factor scale for each surface of the second set of surfaces.

13. A non-transitory computer-readable storage medium having embodied thereon instructions executable by a processor to perform a method for rendering computer graphics, the method comprising:
create a displacement map for a plurality of surfaces;
sampling the plurality of surfaces in the created displacement map;
initialize a tessellation process;
determine a tessellation density for a first set of surfaces based on the displacement map;
assign a texture to the tessellation factor scale based on identifying that a tessellation factor scale corresponding to the tessellation density is associated with an amount of computational resources above a performance threshold;
modify the first set of surfaces by applying the assigned texture to each surface of the first set of surfaces;
determine to decrease the tessellation density for a second set of surfaces based on the displacement map; and
modify the second set of surfaces by decreasing a tessellation factor scale for each surface of the second set of surfaces.

14. The non-transitory computer-readable storage medium of claim 13, wherein the displacement map is created in a pre-process prior to run-time.

15. The non-transitory computer-readable medium of claim 13, wherein sampling the plurality of surfaces in the created displacement map comprises:
sampling the displacement map across the first set of surfaces at a first density;
subsequently sampling the displacement map across the first set of surfaces at a second density, the second density being lower than the first density;
determining that the first set of surfaces is matched below a first threshold accuracy; and
sampling the displacement map across the first set of surfaces at a third density that is higher than the second density, but lower than the first density based on the determination.

16. The non-transitory computer-readable medium of claim 15, further comprising instructions executable to sample the displacement map across the first set of surfaces at successively higher densities until a threshold accuracy is met.

17. The non-transitory computer-readable medium of claim 13, wherein screen-space tessellation is configured to be scaled at run-time by the tessellation factor scale for each surface of the first set of surfaces and the tessellation factor scale for each surface of the second set of surfaces.

* * * * *